H. WEICHSEL.
STARTING DEVICE FOR ELECTRICAL MOTORS.
APPLICATION FILED JUNE 17, 1908.

957,587.

Patented May 10, 1910.
4 SHEETS—SHEET 4.

WITNESSES:
L. L. Mead.
W. A. Alexander.

INVENTOR
Hans Weichsel
BY
ATTORNEYS

UNITED STATES PATENT OFFICE.

HANS WEICHSEL, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

STARTING DEVICE FOR ELECTRICAL MOTORS.

957,587.  Specification of Letters Patent.  Patented May 10, 1910.

Application filed June 17, 1908. Serial No. 438,928.

*To all whom it may concern:*

Be it known that I, HANS WEICHSEL, a subject of the Emperor of Germany, a resident of the city of St. Louis, State of Missouri, have invented a certain new and useful Starting Device for Electrical Motors, of which the following is such a full, clear, and exact description as will enable any one skilled in the art to which it appertains to make and use the same, reference being had to the accompanying drawings, forming part of this specification.

My invention relates to starting device for electric motors, and has for one of its objects the production of a starting device in which the movement of the movable member will be automatically continued from one controller position to another after said movement has been begun by suitable, manually operated means.

Figure 1:
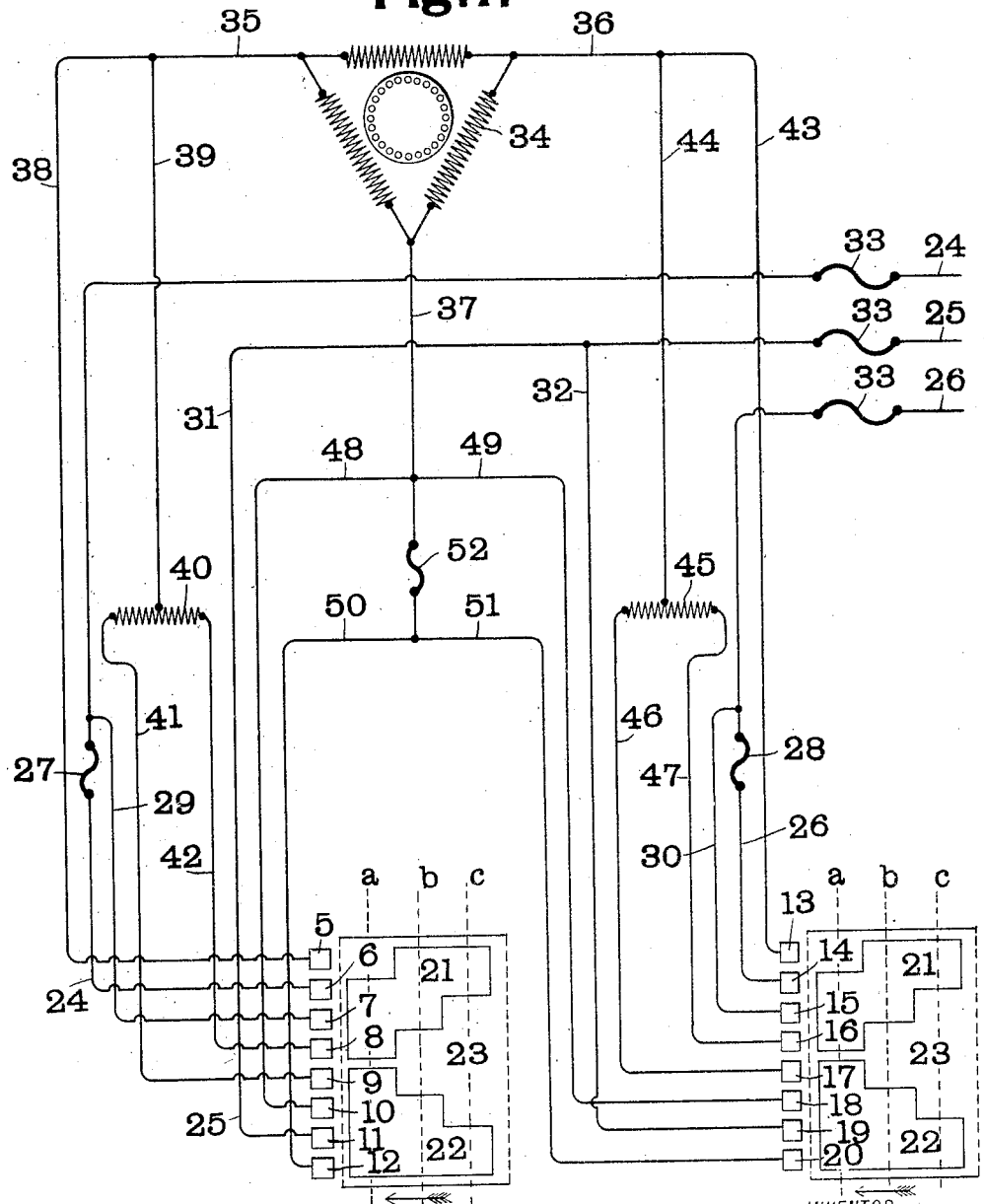
Figure 2:
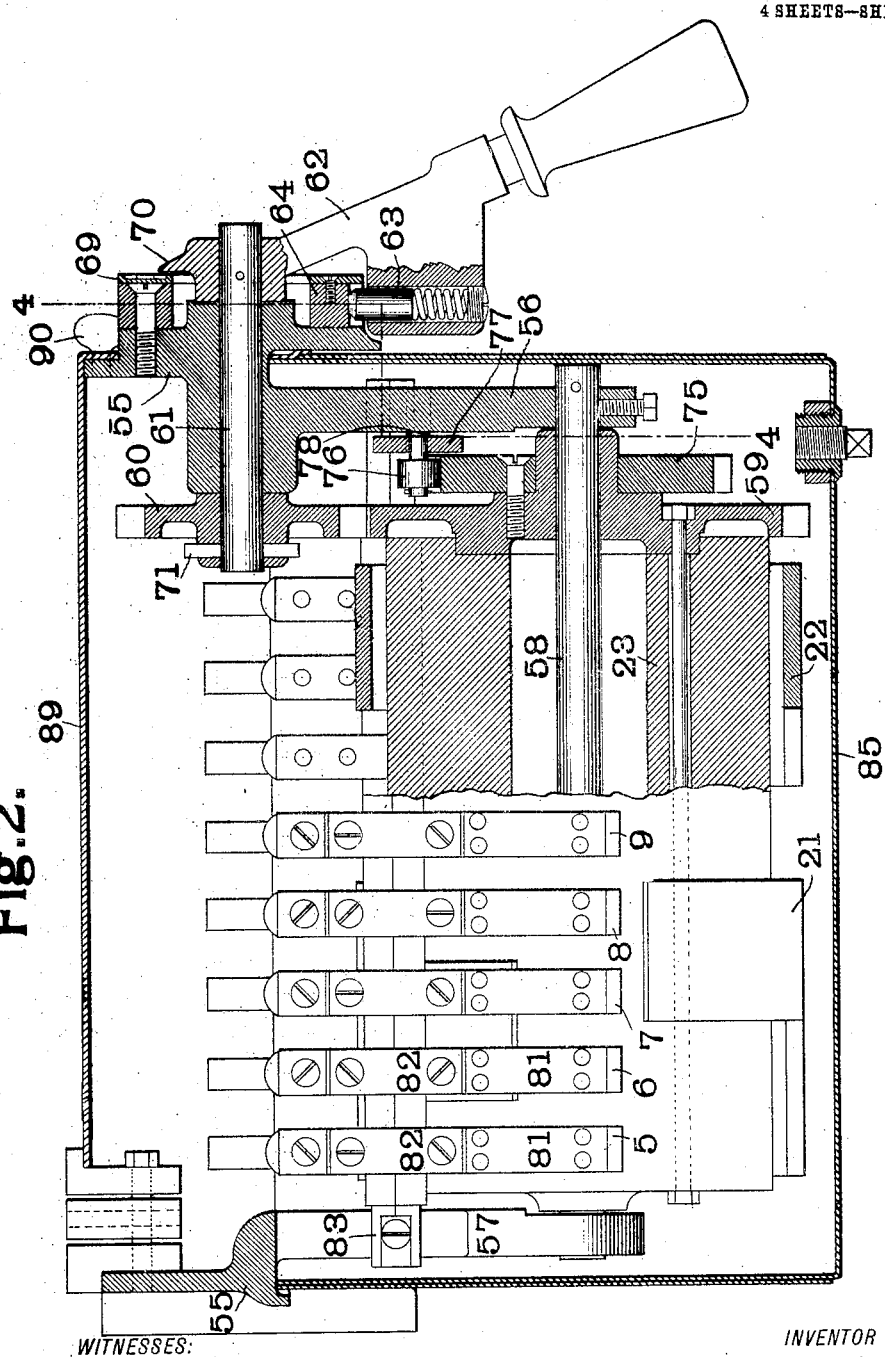
Figure 3:
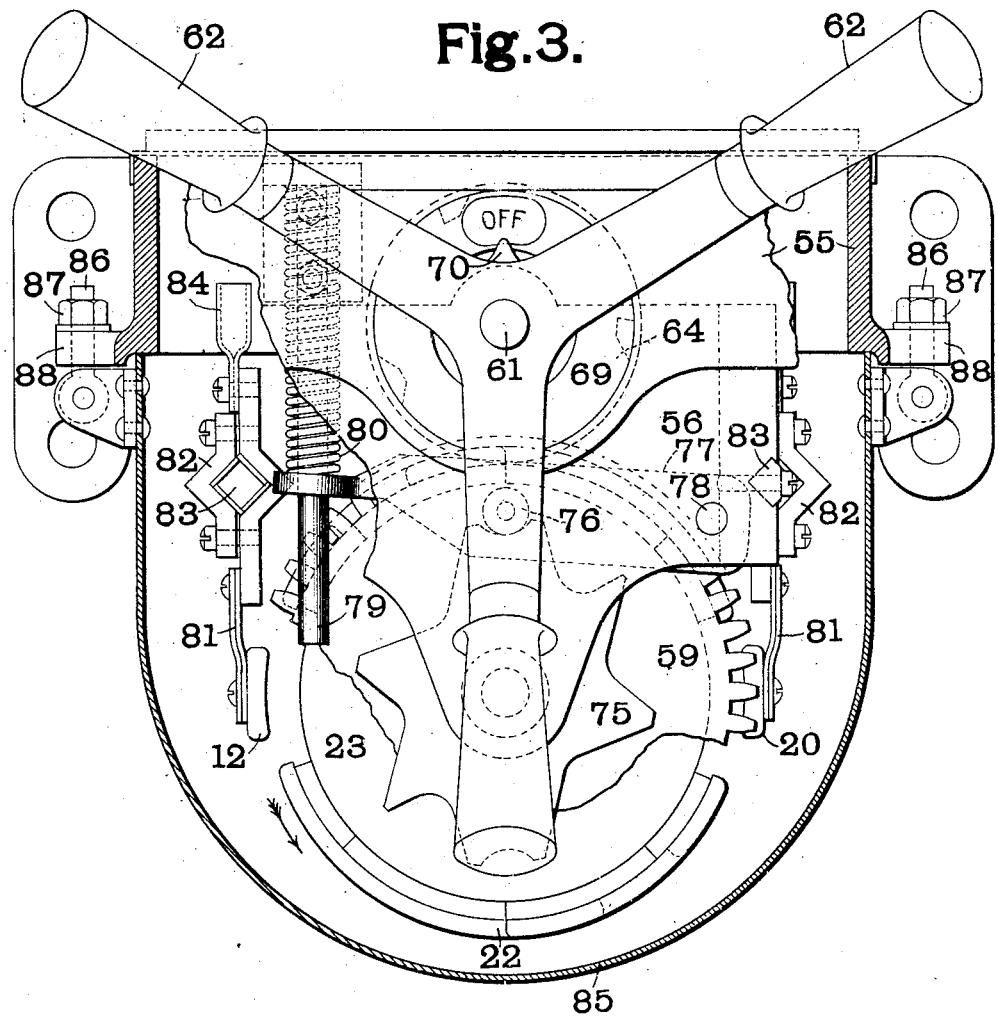
Figure 4:
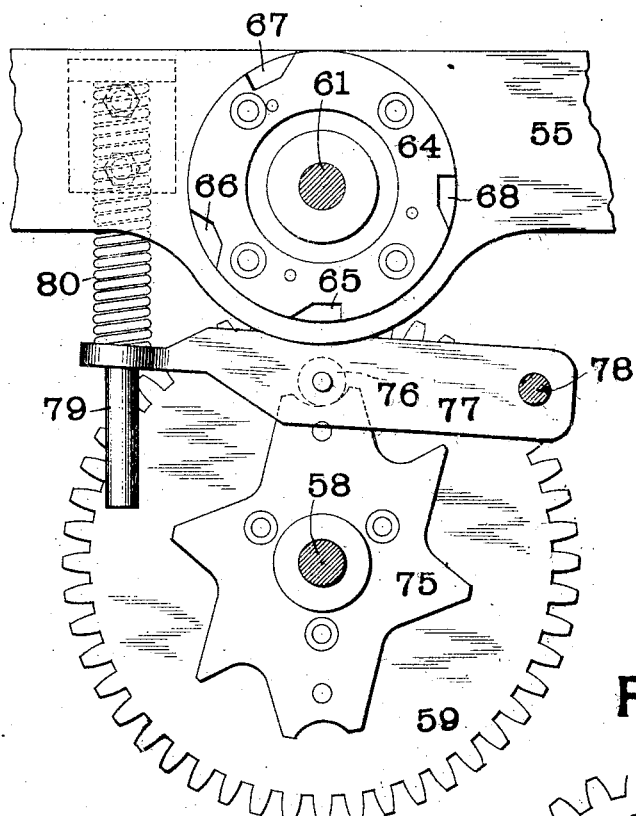
Figure 5:
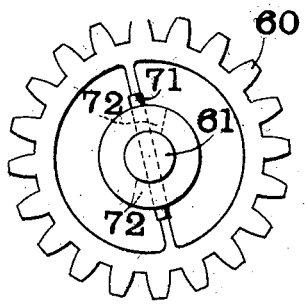

In the accompanying drawings which illustrate one form of starting device, made in accordance with my invention, Figure 1 is a diagrammatic view of the complete system; Fig. 2 a longitudinal vertical section through the controller box; Fig. 3 is the front view, partially in section, of the controller box, and Fig. 4 is a detail view taken on the line 4—4 of Fig. 2. Fig. 5 is a rear view of one of the operating gears.

Like marks of reference refer to similar parts in the several views of the drawings.

Contact fingers, sixteen in number, are provided and arranged in two sets; one set consisting of eight contact fingers is numbered 5 to 12 inclusive, and the other set, also consisting of eight fingers is numbered 13 to 20 inclusive. The various changes in the circuits are accomplished by the engagement of these fingers with two sets of contact plates. Each of the sets of contact plates consists of two plates 21 and 22 respectively. These plates are carried upon a drum 23 which is rotated as will be hereinafter described.

24, 25 and 26 are line wires supplying polyphase current. The line wire 24 extends to the contact finger 6 of one set of contact fingers, and the line wire 26 extends to the corresponding contact finger 14 of the other set. Contained in these line wires 24 and 26 are fuses 27 and 28 respectively or other suitable protective devices. Connected with the line wire 24 beyond the fuse 27 is a shunt circuit 29 which leads to the contact finger 7, a similar shunt circuit 30 is connected to the line wire 26 beyond the fuse 28, and leads to the contact finger 15. The line wire 25 is provided with two branches 31 and 32 which lead respectively to the contact fingers 11 and 19. Contained in the line wires 24, 25 and 26 are fuses or other protective devices 33 arranged to carry a larger current than the protective devices 27 and 28 hereinbefore referred to.

34 is an alternating current motor provided with three terminal wires 35, 36 and 37 respectively. The line wire 35 is provided with two branches 38 and 39, the former of which leads to the contact finger 5 and the latter to an auto transformer 40. This auto transformer 40 is connected at one end by a line 41 to the contact finger 9; at the other by a line 42 to the contact finger 8. The motor line 36 is also provided with two branches 43 and 44 respectively. The former leads to the contact finger 13 and the latter to an auto transformer 45. This auto transformer 45 is connected at one end by a line 46 to the terminal 17 and at the other by a line 47 to the contact finger 16. The line wire 37 from the motor is provided with four branches 48, 49, 50 and 51 respectively. Arranged in this line 37 between the point where it joins the branches 48 and 49 and the point where it joins 50 and 51 is inserted a fuse 52 or other protective device. The branch 48 is connected to the contact finger 10; the branch 49 to the contact finger 18; the branch 50 to the contact finger 12, and the branch 51 to the contact finger 20.

In order to control the engagement of the contact plates 21 and 22 with the contact fingers, a controller box is provided which will now be described. The upper part of the controller box consists of a frame or casting 55 from which depends front and rear plates 56 and 57 respectively. In these plates 56 and 57 is supported a shaft 58 upon which is mounted the drum 23 hereinbefore referred to, and which carries the plates 21 and 22. The drum 23 has rigidly secured to it a gear wheel 59. This gear wheel 59 meshes with a gear wheel 60 secured to a short shaft 61 which is journaled in the frame or casting 55. The gear 60 is secured to the shaft 61 by means of a pin 71 passing through the said shaft and through an elongated opening or slot 72 formed in the hub of said gear. Owing to this connection when the contact drum is automatically operated to complete the movement from one controller position to another, as will be hereinafter described, the gear 60 has a limited movement relative to the shaft 61 and this will avoid the sudden jerking of the operating handle which would otherwise take place. The gear wheel 60 is of one-half the diameter of the gear wheel 59, so that two revolutions of the former is necessary to impart one complete rotation to the drum 23. Secured to the outer end of the shaft 61 is a handle 62 by means of which the controller is manually operated. This handle 62 is preferably provided with three branches as best shown in Fig. 3. The handle 62 carries a spring actuated catch 63, adapted to engage with notches of the fixed annular member 64 shown in detail in Fig. 4. The notches in the member 64 are four in number, and are numbered 65, 66, 67 and 68 respectively. The notch 65 corresponds to the off position on the controller, that is when the handle is in such position that the catch 63 engages in this notch, the motor is entirely disconnected from the line circuit. This notch is so shaped that the handle can only be moved forward or in clock-wise direction from this position. The notch 66 determines the first running position and corresponds with the position of the controller indicated by the dotted lines $a$ in Fig. 1 of the drawings. This notch is so shaped that the handle may be moved in either direction from this position. The other two notches 67 and 68 correspond with the first and second running positions indicated by lines $b$ and $c$ respectively in Fig. 1, and these notches like the notch 65 are so shaped that the handle can only be moved in a forward or clock-wise direction from either of these positions. The annular member 64 is preferably covered by plate 69, containing suitable characters coöperating with a pointer 70 to indicate the various positions. It will be seen that one rotation of the handle 62 will rotate the drum 23 through one-half revolution, and that the rotation of the drum will be in the opposite direction of that of the handle so as to cause the contacts 21 and 22 to move in the direction indicated by the arrows in Figs. 1 and 3.

In order to automatically complete the movement of the controller drum from one controller position to another after it has been manually started by the handle 62 I provide a cam-wheel 75 which is rigidly secured to the drum 23. This cam-wheel 75 engages with a roller 76 carried on an arm 77 pivoted at one end to the downwardly extending plate 56 by means of a pivot pin 78, and at the other is provided with an opening through which passes a rod 79. This rod 79 is provided with a coil spring 80 which bears upon the end of the arm 77 and this forces the roller 56 into contact with the cam-wheel which is so shaped that when the movement from one controller position to another is begun the pressure of the roller will act to complete the movement to the next controller position. The contact fingers 5 to 12 and 13 to 20 are carried on springs 81 which are in turn carried by clamping devices 82 secured on, but insulated from rods 83 which are carried by the plates 56 and 57. The upper ends of the clamping device 82 are provided with line terminals 84 in which the lines hereinbefore referred to may be secured. In order to protect the parts of the controller a sheet metal housing 85 is provided which is secured to the frame or casting 55 by means of swing bolts 86 and nuts 87 which engage with lugs 88 of the side frame or casting 55. The sheet metal top 89 is also provided which may be secured in place by means of thumb screws 90.

In the operation of my device when drum 23 is in the position indicated in Fig. 1 of the drawings the motor is entirely disconnected from the supply circuit. When, however, the handle 62 is moved toward the right so as to bring the catch 63 into engagement with the notch 66 the drum is rotated in contra-clock-wise direction so as to bring the contact fingers into engagement with the contact plates 21 and 22 along the lines $a\ a$ of Fig. 1. The current from line wire 24 now passes down through the fuse 27 to the contact 6 and at the same time through the shunt 29 to the contact 7. These contacts being connected by means of the plate 21 with the contact 8 which in turn is connected with the auto transformer 40. In like manner the current from the line wire 26 passes through the fuse 28 to the terminal 14, and at the same time through the shunt 30 to the terminal 15, both of these terminals being connected by means of the plate 21 with the terminal 16 which is connected to the one end of the auto transformer 45. The current from the line wire 25 passes through the two branches 31 and 32 to the terminals 11 to 19 which are connected through the contact plate 22 with the terminals 9 and 17 respectively which are attached to the opposite end of the auto transformers 40 and 45, thus completing the line circuit through the fuses, shunt circuits, and auto transformers. The motor line 35 is connected by the branch 39 to the auto transformer 40 and the line 36 to the auto transformer 45, and the line 37 through the branches 50 and 51 to the contacts 12 and 20, and at the same time through the branches 48 and 49 with the contacts 10 and 18. It will thus be seen that the motor is connected to the auto transformer so as to receive a reduced current at starting, and at the same time is connected with the fuse 52 and is also provided with a shunt around said fuse. From this position the controller drum may be either moved forward or moved back to the off position. In case it is moved forward to bring the contacts into engagement with the plates 21 and 22 along the lines $b$, the contacts 5 and 13 will be brought into engagement with the plate 21 so as to connect the motor lines 35 and 36 directly with the supply line and at the same time the contacts 8 and 16 will move out of engagement with the plate 21, and the contacts 9 and 17 out of engagement with the plate 22 so as to cut the auto transformers 40 and 45 out of circuit. In this, which, I term the first running position, the handle 62 cannot be moved back toward the starting position, but can only be moved forward. The further forward movement of the handle brings the contacts into engagement with the plates 21 and 22 along the lines $c$ $c$, so that the terminals 7 and 15 will move out of engagement with the plate 21 to break the shunt 29 and 30 around the fuses 27 and 28, and at the same time the contacts 10 and 18 will move out of engagement with the plate 22 so as to break the shunts around the fuse 52. The further movement of the handle brings controller to the original or off position as indicated in Fig. 1 and stops the operation of the motor.

Having fully described my invention, what I claim as new and desire to secure by Letters Patent of the United States, is:

1. In an electrical starting device, the combination with a rotary contact member, of a rotary handle for actuating said contact member, a stationary member coöperating with said handle and provided with notches for determining the controller positions of said rotary member, and a cam and yielding coöperating member for completing the movement of said contact member from each controller position to the one succeeding.

2. In an electrical starting device, the combination with a rotary contact member, of a rotary handle for actuating said contact member, a stationary member coöperating with said handle and provided with notches for determining the controller positions of said rotary member, a cam carried by said contact member, and a yielding member coöperating with said cam to complete the movement of said contact member from each controller position to the one succeeding.

3. In an electrical starting device, the combination with a rotary contact member, of a rotary handle, gearing connected to said handle and contact member, whereby the rotation of the former moves the latter into different controller positions, a fixed member coöperating with said handle and provided with notches for determining the controller positions, a cam carried by said contact member, and a spring actuated member coöperating with said cam to automatically complete the movement of said contact member from each controller position to the one succeeding.

In testimony whereof, I have hereunto set my hand and affixed my seal in the presence of the two subscribing witnesses.

HANS WEICHSEL. [L. S.]

Witnesses:
B. M. SCHLICHTING,
BESSIE STEWART.